United States Patent [19]

Der Manuelian

[11] Patent Number: 5,360,034
[45] Date of Patent: Nov. 1, 1994

[54] DUAL FUEL TANK SYSTEM

[75] Inventor: Raffi Der Manuelian, Grand Blanc, Mich.

[73] Assignee: General Motors Corporation, Detroit, Mich.

[21] Appl. No.: 203,175

[22] Filed: Feb. 28, 1994

[51] Int. Cl.$^5$ .............................................. E03B 11/00
[52] U.S. Cl. ..................................... 137/571; 137/587; 137/561 A; 123/514; 285/155
[58] Field of Search ............... 137/587, 589, 565, 571, 137/561 A; 123/514; 285/155

[56] References Cited

U.S. PATENT DOCUMENTS

| | | | |
|---|---|---|---|
| 3,335,462 | 8/1967 | Grisull et al. | 137/571 |
| 3,884,255 | 5/1975 | Merkle | 137/265 |
| 4,552,175 | 11/1985 | Schiemann | 137/571 |
| 4,809,743 | 3/1989 | Sukimoto et al. | 137/561 A |
| 4,852,892 | 8/1989 | Reid | 280/834 |
| 4,913,183 | 4/1990 | Vogel et al. | 137/561 A |
| 4,930,537 | 6/1990 | Farmer | 137/571 |
| 5,197,443 | 3/1993 | Hodgkins | 123/514 |

FOREIGN PATENT DOCUMENTS 6508579  2/1966  Netherlands .................. 285/155

Primary Examiner—A. Michael Chambers
Attorney, Agent, or Firm—Jeffrey A. Sedlar

[57] ABSTRACT

A dual fuel tank system for a vehicle including a fill limiter tee disposed in the fill limiter line of the main fuel tank through which fuel is transferred from the auxiliary tank to the main tank and fluid can flow between the two tanks.

5 Claims, 1 Drawing Sheet

DUAL FUEL TANK SYSTEM

BACKGROUND OF THE INVENTION

This invention relates to a dual fuel tank system for a vehicle.

Well known are vehicles, particularly working trucks, that are designed with multiple fuel tanks in order to provide an adequate on-board fuel storage capacity. In certain dual fuel tank system applications, such as when a dump truck body or tow truck body is mounted on a vehicle frame, the frame behind the rear wheels must be shortened. This eliminates the ability to use a single rear mounted fuel tank having an adequate capacity. In such situations, a mid-mounted fuel tank in combination with a smaller rear-mounted fuel tank may be used to satisfy the fuel storage capacity demands of the vehicle owner. Therefore, the situation arises where both a single and a dual fuel tank arrangement may be preferable in a given vehicle platform with a single general vehicle frame construction. Additionally, a preference exists to provide the ability to install an auxiliary fuel tank in a vehicle as an option to the purchaser. When dual tanks are used, the tanks are normally provided with individual filler ports or filler pipes. Other designs may incorporate a mechanism for branching multiple filler pipes from one filler port location into each of the fuel tanks. In either case there is generally a fill limiter line associated with each filler pipe involved in fuel fill nozzle shut-offs that requires an additional connection to each fuel tank.

In order to provide an acceptable dual fuel tank arrangement a system must conform to several parameters known generally in the art. Two, that significantly effect the system's physical arrangement, include evaporative emission control requirements placed upon vehicle fuel systems and fuel fill characteristics requirements. In regard to the former, fuel tanks are generally substantially closed to the atmosphere with the exception of a vent that is routed through an evaporative emission control system to collect, store and use evaporated hydrocarbons from the fuel. Therefore, both tanks in a dual system include a provision for connecting to the emission control system. In regard to the latter, the tank system must exhibit acceptable fuel fill characteristics. These include allowing an adequate fill volume rate without excessive spit-back and initiating acceptable fuel fill nozzle shut-off without unacceptable premature shut-offs. These critical considerations must be taken into account when designing a dual fuel tank system.

With a dual fuel tank system, the fuel supply piping may be arranged to alternately draw fuel from one tank or the other. Another method of drawing fuel from multiple tanks is to provide a fuel transfer pump which transfers fuel from the auxiliary fuel tank to the main fuel tank, wherein the fuel system continuously draws from the main fuel tank. The fuel transfer mechanism may be automatic or manually activated.

The fuel supply lines leading from a dual fuel tank arrangement to the vehicle's engine, commonly include a solenoid valve to provide a means of switching to the tank that will be utilized to supply an operating engine's fuel demands. The solenoid valve is generally provided with a remote operating switch accessible from the driver's seat so that the driver may elect to use fuel from either one tank or the other. Previous dual fuel tank applications have generally required the driver of the vehicle to manually switch from the main tank to the auxiliary tank.

Due to the various interfacing requirements, a problem arises when a vehicle is designed to be provided alternatively with either one main fuel tank or a main fuel tank and an auxiliary fuel tank. In a given vehicle platform that is available with a single main fuel tank or dual tanks, the main tank will generally have to be altered to work in conjunction with an auxiliary fuel tank in the dual tank system. A provision must be included to make the required connections to each tank. In addition to the fuel supply lines to the vehicle and the filler pipe there are several connections that are generally made to a fuel tank. In a typical dual tank arrangement, each tank has a fill limiter line connection, an emissions control fuel vapor line connection, a vent line and a fuel return line from the engine.

It is desirable to have the flexibility to design a vehicle with alternative provisions for either a single main fuel tank or a combination main fuel tank with auxiliary fuel tank system. This desire confronts an obstacle when alterations must be made to the main fuel tank to conform it for operation in both types of arrangements. In such situations, the combination of the filler pipe, fill limiter line, emissions control vent line and fuel transfer lines complicate the ability to provide the selective alternative single tank or dual tank arrangement in a single vehicle. The main fuel tank may have to be substantially altered in order to work in conjunction with an auxiliary fuel tank. Therefore, particularly in such a situation, a problem exists.

SUMMARY OF THE INVENTION

A principle object of the present invention is to overcome the problems associated with prior dual fuel tank arrangements and permit the use of an alternative main fuel tank or combination dual fuel tank system in a single vehicle platform, without substantial alteration of the main fuel tank design. This invention simplifies dual fuel tank system arrangements through use of the unique fill limiter tee. The fill limiter tee allows the connection of the vapor/overflow line routed between the main fuel tank and the auxiliary fuel tank at the tee location of the fill limiter line. Additionally, the fuel transfer line from the auxiliary fuel tank is routed through the fill limiter tee and the fill limiter line to the main fuel tank.

At least the main tank includes a filler pipe communicating therewith for the introduction of fuel into the system. The filler pipe operates in conjunction with a fill limiter line to cooperate with a fuel fill nozzle generally known in the art to prevent overfilling of the fuel tank. The fill limiter line defines a conduit between the top of the fuel tank and the filler pipe near a filler port which includes a nozzle opening. The fill limiter line includes a fill limiter tee disposed therein that preferably includes facilities for two branch piping connections. A fuel transfer line, including a means to generate a flow therethrough, defines a conduit between the auxiliary fuel tank and a branch piping connection of the fill limiter tee. This provides a means for transferring fuel from the auxiliary tank to the main tank. A second conduit communicates with the top portion of the auxiliary tank and the other branch piping connection of the fill limiter tee for the transfer of air, vapors and overflow fuel between the two tanks.

One of the particularly beneficial characteristics of the fill limiter tee is its multifaceted ability to allow the transfer of fuel from the auxiliary fuel tank to the main fuel tank in combination with the flow of air, evaporate and fuel overflow between the tanks while not adversely affecting the fuel fill characteristics of the fuel tanks. The dual fuel tank arrangement with the fill limiter tee located in the fill limiter piping leading to the main fuel tank offers a new method for transferring fuel from the auxiliary fuel tank to the main fuel tank. A benefit provided by use of the dual tank fill limiter tee is the resulting simplified fuel line routing arrangement. The tee arrangement generally requires no changes to the main fuel tank when an auxiliary fuel tank in combination with the automatic fuel transfer system is used with a main fuel tank that was originally designed to operate in a single fuel tank system for a vehicle. This results in a cost savings and a reduced proliferation of distinct component parts in a vehicle platform's fuel tank system arrangement.

DETAILED DESCRIPTION OF THE PRESENTLY PREFERRED EMBODIMENT

Figure 1:
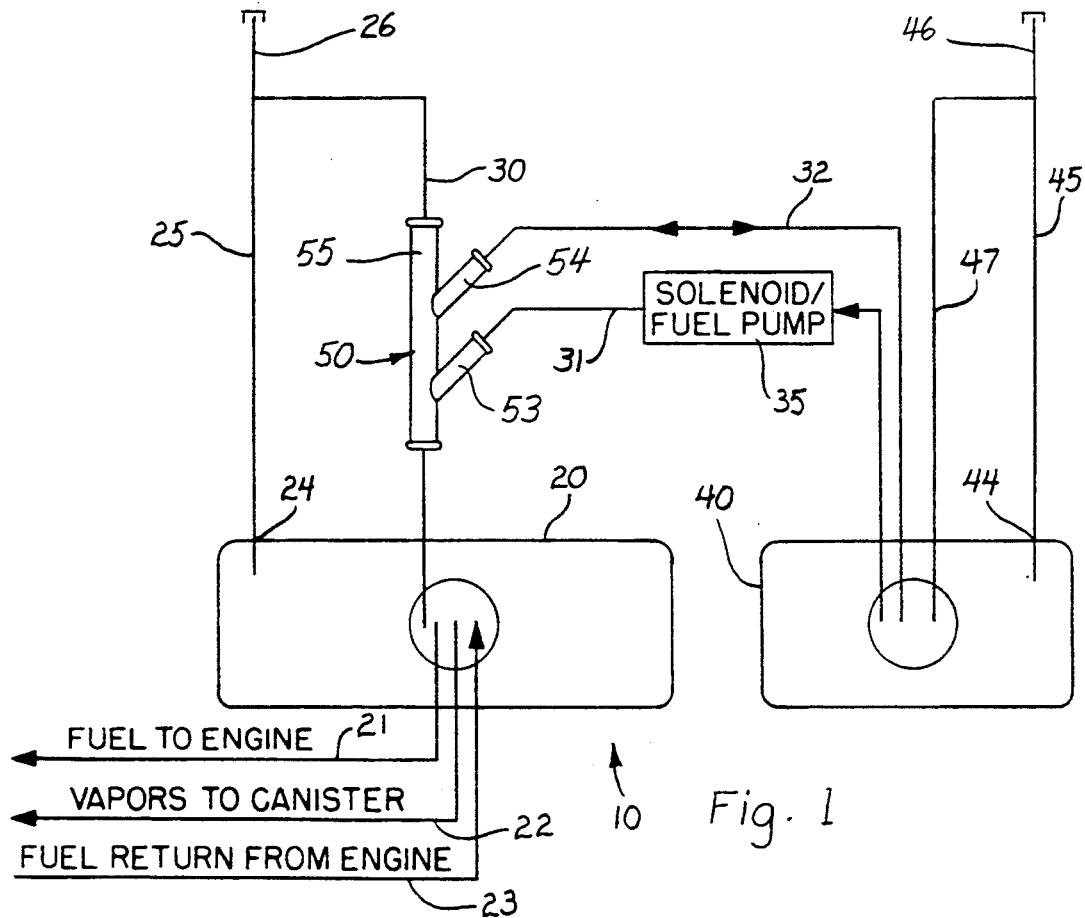
FIG. 1 is a schematic view of a dual fuel tank system arranged with a fill limiter tee according to the present invention.

Referring to FIG. 1, there illustrated is a dual fuel tank system 10 arranged according to the present invention. Included is a main fuel tank 20 having connected conduits 21–23. Conduit 21 is associated with fuel supplied to the engine, conduit 22 with vapor and air transfer to or from the evaporative emission control system and conduit 23 with a fuel return line from the engine. Within tank 20, a preestablished fluid full line exists thereby establishing an air space in the top of the tank under all normal fluid level conditions.

In communication with the main fuel tank 20 is a filler neck 24 leading to the filler pipe 25 that terminates at the tank filler port 26 defining a conduit for introducing fuel into tank 20. A fill limiter line 30 is in communication with the fuel tank 20 and the filler pipe 25. The fill limiter line 30 extends within tank 20 from the top and terminates at the preestablished fluid full line. During refueling, when the fluid level in tank 20 reaches the full line and contacts the end of fill limiter line 30 a resulting pressure change in filler port 26 cooperates with a fuel fill nozzle (not shown) thereby interrupting fuel flow. Therefore, a fuel tank system involving changes to previously known fill limiter line arrangements must be designed to maintain proper operation of this function.

The auxiliary fuel tank 40 is also provided with a filler port 46 leading to a filler pipe 45 for adding fuel to tank 40. A filler neck 44 connects filler pipe 45 to tank 40. A fill limiter line 47, communicates with fuel tank 40 and filler pipe 45. The auxiliary fuel tank 40 communicates with the main fuel tank 20 through a fuel transfer line 31, that includes a fuel pump 35 for transferring fuel from the auxiliary fuel tank 40 to the main fuel tank 20, preferably automatically. In addition, a vapor/overflow line 32 provides a means of communication between the auxiliary fuel tank 40 and the main fuel tank 20 for vapors routed to the evaporative emission control system (not shown) and for fuel overflow between tanks 20 and 40. The vapor/overflow line 32 preferably extends into the auxiliary fuel tank 40 and terminates in the air space defined above the fuel full line. Vapor/overflow line 32 also provides a route for replacement air to enter auxiliary tank 40 during fuel transfer.

The unique arrangement of the aforementioned dual fuel tank system components is made possible through the use of a fill limiter tee 50. The fill limiter tee 50 is positioned in fill limiter line 30 of the main fuel tank 20. Of critical importance is the ability of fill limiter line 30 to correctly function for fill nozzle shut-offs, unhindered by the interpositioning of fill limiter tee 50.

Figure 2:
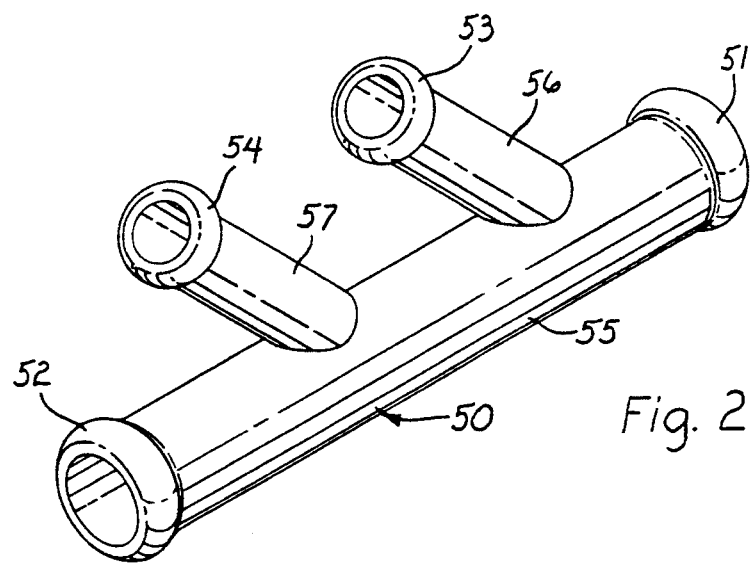
FIG. 2 is a detail illustration of the fill limiter tee.

Fill limiter tee 50 is shown in more detail in FIG. 2. Tee 50 includes a main conduit 55 defining a segment of the fill limiter line 30. Branch conduits 56 and 57 define paths for fluid flow into or out of the main conduit 55. The inside diameter of flow path 55 is greater than that of branch conduits 56 or 57 allowing for simultaneous flow through each of conduits 56 and 57 through communication with main conduit 55.

Four piping connections 51–54 are provided as part of the fill limiter tee 50. Two of the piping connections 51 and 52 are provided to position the fill limiter tee 50 in-line along the fill limiter line 30. Two additional branch piping connections 53 and 54 are provided for communication between the main fuel tank 20 and the auxiliary fuel tank 40. A first branch piping connection 53 located nearest the main fuel tank 20 in fill limiter tee 50 is provided for attachment to the fuel transfer line 31 from auxiliary fuel tank 40. By means of the preferable automatically activated fuel pump 35 located in fuel transfer line 31, fuel is drawn from the auxiliary fuel tank 40 into fuel transfer line 31 and is routed through fill limiter tee 50 into fill limiter line 30 of the main fuel tank 20 and then into the main fuel tank 20. The second branch piping connection 54, located in fill limiter tee 50 further from the main fuel tank 20 than first branch 53, is provided for connection to vapor/overflow line 32 and communication with the auxiliary fuel tank 40.

Venting means for the auxiliary fuel tank 40 is supplied by the fluid conduit defined by vapor/overflow line 32 through the fill limiter tee 50 and the fill limiter line 30 into the main tank 20. Substantially equal fuel tank pressure is maintained between the two tanks through vapor/overflow line 32. Therefore, it is preferable that fill limiter tee 50 simultaneously routes fuel flow from the auxiliary fuel tank 40 during fuel transfer and air flow to the auxiliary fuel tank 40 to replace the displaced volume created by the transferred fuel. The vapor/overflow line 32 also provides a mechanism allowing for the routing of overflow fuel between the main fuel tank 20 and the auxiliary fuel tank 40. Fuel evaporate from the auxiliary fuel tank 40 can freely flow through vapor/overflow line 32 into the main tank 20 and then continue to the vehicle's evaporative emission control system (not shown) through conduit 22.

The required fuel system operational features are met through the dual fuel tank system arrangement, as described. Preferred fuel fill characteristics of the dual tank arrangement are maintained. Each tank's fill volume rate and fill limiter mechanism operate properly under the varying conditions present.

The fuel transfer line 31, the vapor/overflow line 32 and the fill limiter line 30 of the main tank 20 communicate with the fill limiter tee 50. The four connections 51–54, between the fill limiter tee 50 and the mating conduits 30–32 can be hose beads, quick-connects, threaded piping connections or similar mechanisms. When installed in a vehicle, the fill limiter tee 50 is preferably disposed in a location proximate to the main fuel tank 20 and at a height above the fuel full line within the two tanks. The described fuel fill limiter tee 50, according to the present invention, is directed toward simplifying the fuel line routing between multiple fuel tanks of a vehicle. The simplified arrangement is achieved without adversely affecting the fuel fill characteristics of the tank arrangement. Adequate fill volume is maintained without undesirable spit-backs or excessive premature shut-offs.

While this invention has been described in terms of a preferred embodiment thereof, it will be appreciated that other forms could readily be adapted by one skilled in the art. Accordingly, the scope of this invention is to be considered limited only by the following claims.

The embodiments of the invention in which an exclusive property or privilege is claimed are defined as follows:

1. A fuel tank system for a vehicle comprising:
   a first fuel tank;
   a second fuel tank;
   a filler pipe communicating with the first fuel tank for adding fuel to the first fuel tank;
   a fill limiter line communicating with the first fuel tank and the filler pipe including a fill limiter tee disposed in the fill limiter line;
   fuel transfer means communicating with both fuel tanks for transferring fuel from the second fuel tank to the first fuel tank through the fill limiter tee;
   a vapor-overflow conduit communicating with both fuel tanks for transferring fluid between the fuel tanks through the fill limiter tee.

2. A fuel tank system according to claim 1 wherein the fill limiter tee includes a first branch conduit communicating with the fuel transfer means and a second branch conduit communicating with the vapor-overflow conduit, the first branch conduit disposed nearer the first fuel tank than the second branch conduit.

3. A fuel tank system for a vehicle comprising:
   a first fuel tank;
   a second fuel tank;
   a filler pipe communicating with the first fuel tank;
   a fill limiter conduit communicating with the filler pipe and the first fuel tank;
   a fill limiter tee disposed in the fill limiter conduit having a first piping connection and a second piping connection communicating with the fill limiter conduit, the fill limiter tee defining a segment of the fill limiter conduit, a third piping connection communicating with a fuel transfer line providing a means for transferring fuel from the second fuel tank to the first fuel tank through the fill limiter tee and a fourth piping connection communicating with a vapor-overflow line providing a means for fluid to flow between the tanks.

4. A fuel tank system for a vehicle comprising:
   a main fuel tank;
   a first filler pipe forming a conduit communicating with the main fuel tank for adding fuel to the main fuel tank;
   a first fill limiter line forming a conduit communicating with the first filler pipe and the main fuel tank;
   a fill limiter tee having a first and a second branch piping connection disposed in the first fill limiter line;
   an auxiliary fuel tank;
   a second filler pipe forming a conduit communicating with the auxiliary fuel tank for adding fuel to the auxiliary fuel tank;
   a second fill limiter line forming a conduit communicating with the second filler pipe and the auxiliary fuel tank;
   a fuel transfer line forming a conduit communicating with the auxiliary fuel tank and the first branch piping connection of the fill limiter tee for transferring fuel from the auxiliary fuel tank to the main fuel tank;
   a vapor-overflow conduit communicating with the auxiliary fuel tank and the second branch piping connection of the fill limiter tee for fluid flow between the two tanks.

5. A fuel tank system for a vehicle having an engine and an evaporative emission control system, comprising:
   a main fuel tank;
   a fuel line forming a conduit between the main fuel tank and the engine for supplying fuel from the fuel tank to the engine;
   a return line forming a conduit between the main fuel tank and the engine for returning unused fuel from the engine to the main fuel tank;
   a vapor line forming a conduit between the main fuel tank and the evaporative emission control system for conveying air and fuel vapor between the main fuel tank and the evaporative emission control system;
   a first filler pipe forming a conduit leading to the main fuel tank for adding fuel to the main fuel tank;
   a first fill limiter line forming a conduit between the first filler pipe and the main fuel tank;
   a fill limiter tee having a first and a second branch piping connection disposed in the first fill limiter line;
   an auxiliary fuel tank;
   a second filler pipe forming a conduit leading to the auxiliary fuel tank for adding fuel to the auxiliary fuel tank;
   a second fill limiter line forming a conduit between the second filler pipe and the auxiliary fuel tank;
   a fuel transfer line forming a conduit between the auxiliary fuel tank and the first branch piping connection of the fill limiter tee for transferring fuel from the auxiliary fuel tank to the main fuel tank;
   a vapor-overflow conduit between the auxiliary fuel tank and the second branch piping connection of the fill limiter tee for transferring fluid between the main fuel tank and the auxiliary fuel tank.

* * * * *